Jan. 3, 1967 L. GRYK 3,296,614

CODE CONVERTER WITH PROVISION FOR AUTOMATICALLY GENERATING PRECEDENCE CODES

Filed March 4, 1964 2 Sheets-Sheet 1

INVENTOR
LEON GRYK
BY Thomas S. Ross
Joseph R. Spalla
ATTORNEYS

United States Patent Office 3,296,614

Patented Jan. 3, 1967

3,296,614

CODE CONVERTER WITH PROVISION FOR AUTOMATICALLY GENERATING PRECEDENCE CODES

Leon Gryk, New Britain, Conn., assignor, by mesne assignments, to Royal Typewriter Company, Inc., a corporation of Delaware Filed Mar. 4, 1964, Ser. No. 349,279
7 Claims. (Cl. 340—347)

Figure 1:
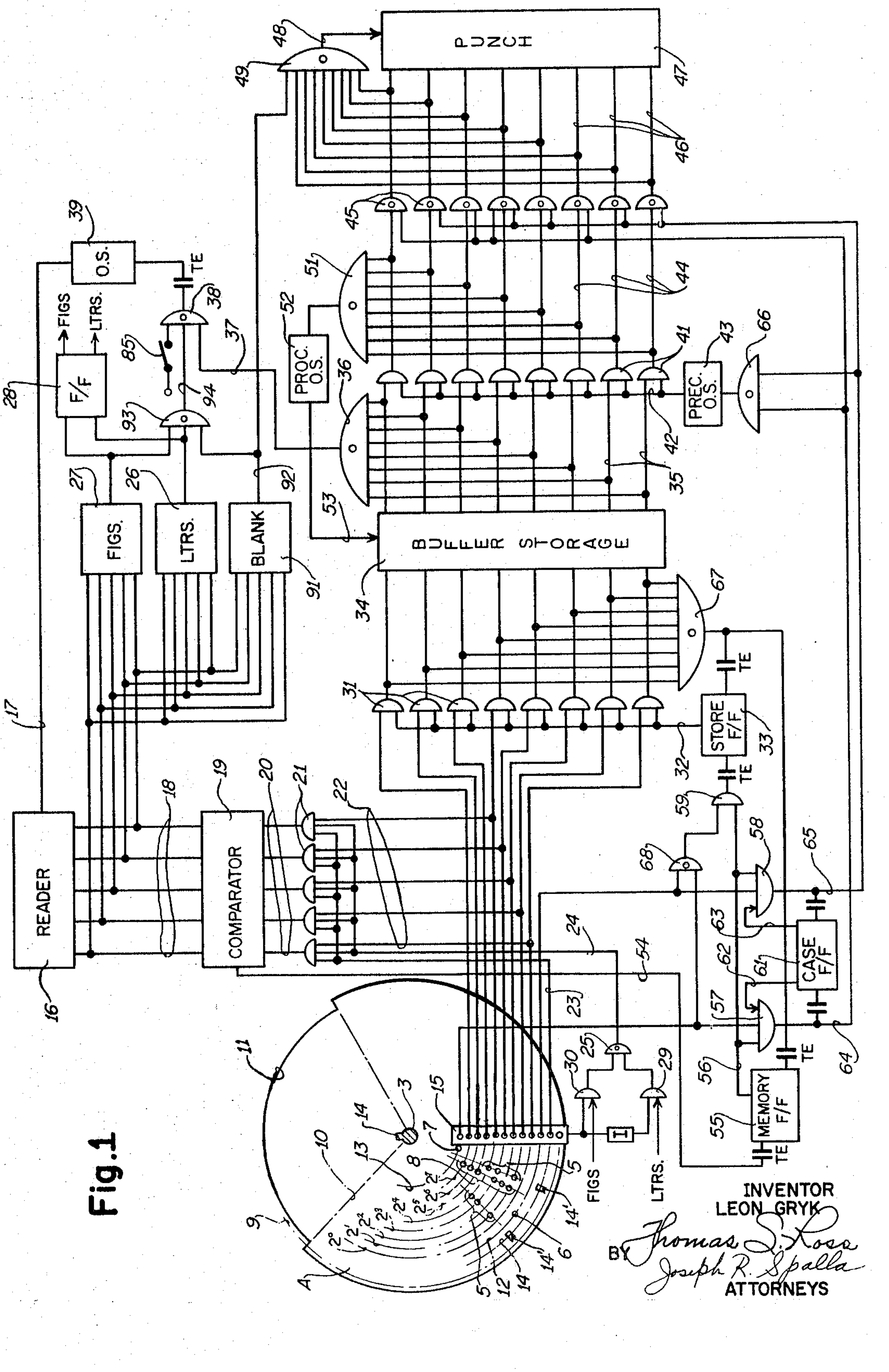

This invention relates to code converters; more particularly it relates to apparatus for converting first system codes into corresponding second system codes characterized by its ability to automatically generate second system precedence codes in a facile manner.

Data processing system generally employ binary codes to represent information. Since the number of combinations possible in an $n$ bit code is $2^n$ it has been the practice to employ two of the possible $2^n$ combinations as precedence codes thereby to permit the use of each of the remaining $2^n-2$ combinations to designate two different characters. For example, codes following one of the precedence codes might represent lower case information on a typewriter keyboard and the same codes following the other precedence code might represent upper case information on the typewriter keyboard. The difficulty in providing apparatus for converting first system codes to second system codes, aside from the fact that many systems do not employ the same code assignment for a particular character, resides in the fact that lower case information in one system is likely to be upper case information in another system. Systems for converting first system codes to second system codes heretofore advanced accommodated the above difficulty only with complex and expensive circuitry.

In accordance with the present invention the above difficulty is accommodated by simple and inexpensive apparatus which permits of the conversion of codes of any one system to codes of any of several other systems by the simple expedient of changing a record on which first system codes to be converted and corresponding codes of a second system to which the first system codes are to be converted are prerecorded. Broadly in accordance with the invention circuitry is provided to compare input and sensed prerecorded first system code signal, and upon coincidence of input and prerecorded code signal to thereafter determine from the prerecorded medium the precedence or case assignment of the character represented by the corresponding second system code, to sense and store the prerecorded second system code signals corresponding to the coincident first system code, and if no precedence change is dictated to read out the stored second system code signals for reproduction or, if a precedence change is dictated, to generate a precedence code signals for reproduction and then read out the stored second system code signals.

An object of the invention is to provide a code to code converter with provision for generating precedence codes in a facile manner.

Another object of the invention is in the provision of apparatus for converting between information representative codes of first and second systems wherein one or the other or both systems employs ambiguous codes to represent upper and lower case information.

A further object of the invention is to provide a code to code converter which is capable of converting first system codes to second system codes wherein character code assignments as well as upper and lower case character assignments differ.

A still further object of the invention is in the provision of a code to code converter employing a record having prerecorded thereon first system codes to be converted and corresponding second system codes to which said first system codes are to be converted and wherein said record also contains second system code precedence or case designators designating the case assimngment of the information represented by each second system code.

Still another object of the invention is in the provision of a code to code converter wherein coincidence of input and prerecorded first system codes enable the readout of corresponding prerecorded second system codes and the generation of second system precedence codes where necessary.

Figure 2:
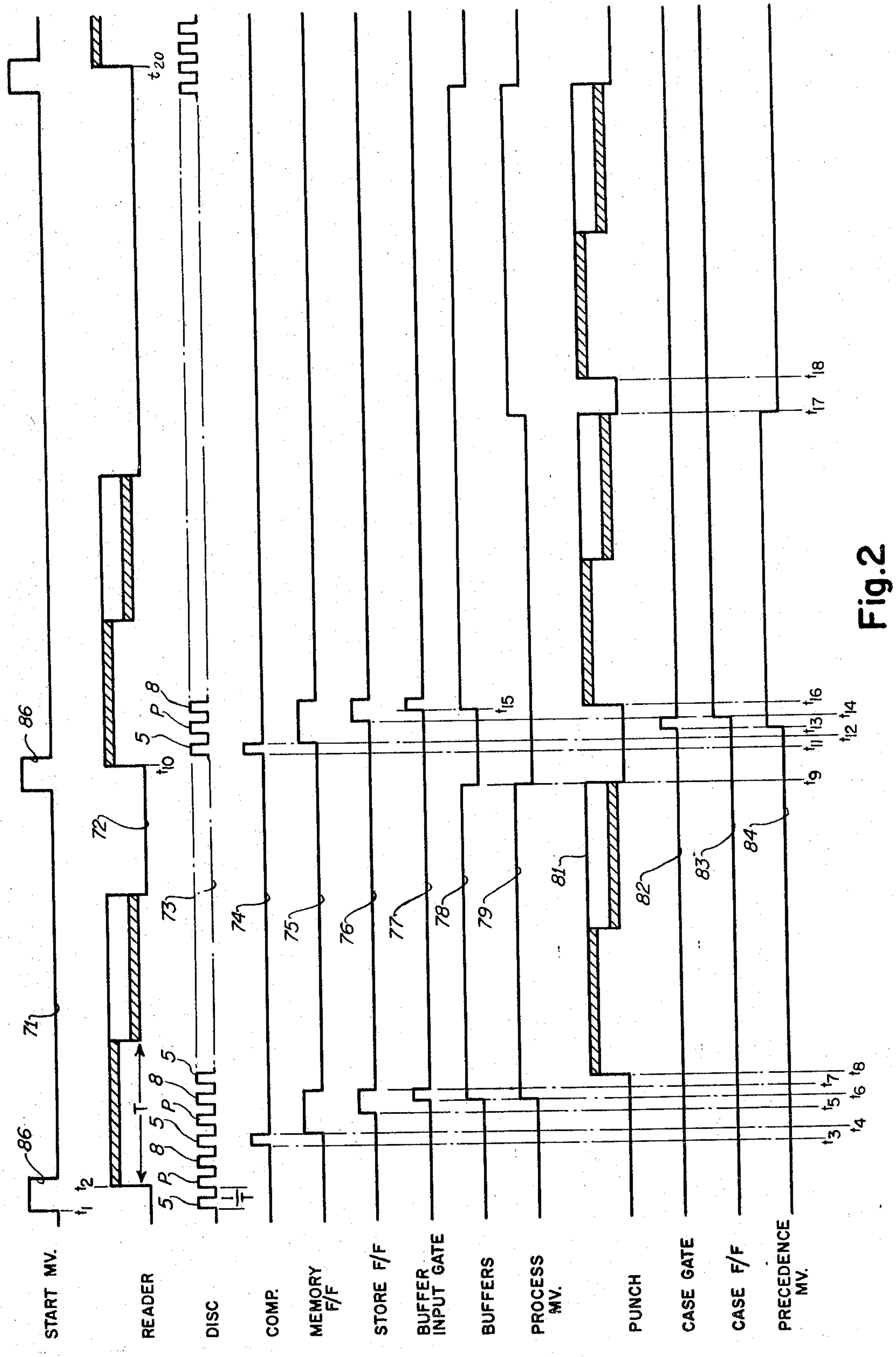

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a schematic block diagram of a converter in accordance with the invention employing a single prerecorded disc; and FIGURE 2 is a timing diagram explanatory of the operation of the converter.

Referring now to the drawings wherein like reference characters designate like or corresponding elements throughout the several views there is shown in FIGURE 1 a disc A which is adapted to be driven continuously at a constant rate by a motor driven shaft 3 having a spline 4 with which a complementary keyway on the disc is cooperatively associated. Disc A has prerecorded therein, in turn along radial lines, as by perforating, first system parallel bit codes 5, second system precedence or case designators 6 or 7 indicating the case assignment of the character represented by the following corresponding second system code, and corresponding second system parallel bit codes 8. The first and second system codes are recorded in parallel circular bit tracks designated $2^0$–$2^n$. In a 5 to 8 converter the first system codes 5 will occupy tracks $2^0$–$2^4$ and the second system codes tracks $2^0$–$2^7$.

Due to the fact that identical codes are, in most systems, employed to represent two different characters, i.e. an upper and a lower case character, and are distinguishable by type basket operating case precedence or letters and figures precedence codes, in order to represent all of the first system characters requires that each dual meaning first system code be recorded twice in the disc A. In accordance with the invention identical codes recorded on the disc A are distinguishable by case or precedence designators represented by the presence or absence of a hole accompanying the codes and recorded in a Figures/Letters precedence designator track 9. As viewed in FIGURE 1 upper case character representative or "Figures" codes are grouped in a sector 10 and identical lower case character representative or "Letters" codes in the remaining disc area, thereby simplifying the recording of case or precedence designator holes by permitting an arcuate peripheral portion 11 to be cut away from the upper case or Figures sector 10 of the disc. Machine function codes such as carriage return, space, etc., which have no case will be recorded in both Letters and Figures sectors. This arrangement permits, as will hereinafter appear, the problem of the ambiguity of identical first system codes to be resolved.

The second system precedence or case designators represented by holes 6 and 7 designating that the character represented by the following code is lower and upper case respectively, will be perforated in a lower case precedence designator track 12 and an upper case precedence designator track 13 respectively. Each first system code also is accompanied by an identifying marker or compare command hole or cutout 14', all of which are located in a compare command track 14 next adjacent the edge of the disc. As will hereinafter appear the identifying marker signals permit the comparison of input first system code signals only with prerecorded first system code signals.

Associated with disc A is a transducer assembly 15 adapted to sense the perforated patterns on the disc. A transducer assembly suitable for sensing hole patterns may comprise a light source on one side and light responsive cells arrayed on the other side of the disc, one cell associated with each track. Accordingly, as the disc rotates the hole patterns will be serially sensed.

In accordance with the invention code signals of one system that are to be converted and which are usually stored in a tape may be supplied to the code converter by a tape reader and corresponding second system codes may be reproduced in a second tape by a record perforator.

A conventional tape reader generally designated by reference numeral 16, which responds to a true signal on a command line 17 may be employed in conjunction with the code converter of the invention. Signals will be designated true or false herein; the former being those which initiate or result from desired operation of a circuit element; the latter signals being the opposite. True and false signals may be positive or negative or vice versa. As will be understood by those conversant in the art a true signal on the command line 17 will cause the reader to cycle whereby during the cycle code signals will be issued to output lines 18 and the record will be indexed.

The speed of the disc will be determined by the interval T (FIGURE 2) that code signals are issued to output lines 18; the disc speed being such that it makes a complete revolution during the interval T that code signal patterns are on line 18.

The reader output lines 18 are connected to a comparator 19 as are the output lines 20 of AND gates 21. The output lines 22 of the light responsive cells associated with tracks $2^0$–$2^4$ are each connected to one input leg of an associated AND gate 21. Also the output line 23 of the cell associated with the command compare track 14 is connected to each of the AND gates 21 via second input legs whereby the gates will be armed to pass only five bit code signals 5 to the comparator. And finally the output line 24 of an OR gate 25 is connected to each of the AND gates 21 via a third input leg. The OR gate 25 is adapted to pass, as will hereinafter appear, a true or arming signal only during intervals 5 bit Figures case designators are being sensed or only during intervals that 5 bit Letters case designators are being sensed. Accordingly, if the reader issues to lines 18 Figures character representative code signals as determined by an issued preceding Figures code signal, when the transducer assembly 15 senses the corresponding case designator in the Figures sector 10 of the disc a true signal will be generated on the output line of the comparator.

To determine which codes are to be compared, i.e., first system Figures or Letters codes, the reader output lines 18 are connected to a Letters code detector 26 and a Figures code detector 27 which recognize these codes and generate a true signal on their output lines which are connected respectively to the set and reset terminals of a case memory flip flop 28 whereby the leading edge of a Letters signal will set the flip flop and the leading edge of a subsequent Figures signal will reset the flip flop. The two outputs of the flip flop are connected respectively to a Letters and a Figures AND gate 29 and 30 whereby if the flip flop is set the output to the Figures AND gate will be false and the output to the Letters AND gate will be true; the opposite obtaining when the flip flop is in reset state. The output line of the cell opposite the Figures/Letters precedence designator track 9 is connected directly to the Figures AND gate 30 and indirectly through an inverter I to the Letters AND gate 29.

If the flip flop 28 is in an assumed Letters or set state, the Letters AND gate output will be true over the interval of time during which no openings in the Figures/Letters precedence designator track 9 are being detected by the associated detector cell of assembly 15. Similarly if the flip flop 28 is in an assumed Figure or reset state, the Figures AND gate output will be true over the interval of time during which openings in the precedence designator track 9 are being detected. The outputs of the case AND gates 29 and 30 are connected to the OR circuit 25 whose output, as hereinbefore noted, conditions or arms AND gates 21 to pass only Letters or Figures information representative code signals on lines 22 as the case may be to the comparator for comparison with code signal patterns on the reader output lines 18.

In view of the above it will be apparent that if the first code issued by the reader is a Letters code the flip flop 28 will, if not already in a set state, switch to set state. Accordingly, the Letters gate 29 will be conditioned to pass Letters precedence designator signals and the Figures gate 30 will be blocked to Figures precedence designator signals. Letters precedence designator signals will be generated when no openings are detected in the precedence designator track 9 and Figures precedence designator signals when openings are detected. Only code signals of codes in the Letters sector of the disc A therefore will be permitted to pass AND gates 21 for comparison with the code signals to be converted; gates 21 being blocked to signals of codes in the Figures sector 10 as both AND gates 29 and 30 will be blocked over the interval codes in sector 10 are passing the transducer assembly 15.

The output lines of the light responsive cells associated with tracks $2^0$–$2^7$ are each connected to one leg of associated AND gates 31 whose other legs are connected to the output line 32 of a store flip flop 33 which is normally in a reset state such that its output is normally false whereby the AND gates 31 are normally blocked. When the flip flop 33 is set as will hereinafter appear, all of the AND gates 31 will be conditioned to pass associated bit signals such that the second system code signals corresponding to the coincident first system code will pass to and set associated flip flops in a buffer unit 34 thereby storing the second system code signals. The bit output lines 35 of the buffer storage unit are connected to an OR gate 36 whose output line 37 is connected to one of three inputs to a second OR gate 38. The output of OR gate 38 is connected to the trigger terminal of a one shot multivibrator 39 which responds to the trailing edge of a true signal passed by OR gate 38. The output signal derived over the active interval of the multivibrator, which might be incorporated in the reader unit logic, is connected to the reader command line 17 and its duration need only be sufficient to assure the initiation of a reader cycle, e.g., an interval at least equivalent to the pull in time of a cycle clutch magnet. The trailing edge of the true signal passed by gates 36 and 38 coincides with the resetting of the buffer unit 34 whereby the reader is cycled only after data in the buffer has been processed as will hereinafter appear.

The buffer output lines 35 are also each connected to one leg of associated AND gates 41 whose other legs are connected to the output line 42 of a single shot precedence delay multivibrator 43. The multivibrator 43 is normally in an inactive or quiescent state such that its output line 42 supplies a true signal to all of the gates 41 with the result that the output line 44 of those gates corresponding to the signals of the code in the buffer unit carry signals via OR gates 45 to the input lines 46 of a conventional record perforating unit generally designated by reference 47. The record perforating unit is one which will reproduce the code signals on lines 46 in a tape in response to a start process or cycle initiating clutch signal on a command line 48. The leading edge of the command signal may be employed to trigger a one shot delay multivibrator within the punch logic which will remain in active state over an interval sufficient to assure the initiation of a punch cycle, e.g., an interval at least equivalent to the pull in time of a cycle clutch magnet. The command line 48 is connected to the output of an OR gate 49 having all 8 code lines 46 connected as inputs, so that if any bit is present on lines 46 a process signal will pass the OR gate 49.

The output lines 44 of AND gates 41 are also connected to an OR gate 51 whose output is connected to a single shot process delay multivibrator 52 whose output is connected to the reset line 53 of the buffer 34. The delay provided by multivibrator 52 is to assure sufficient time for the punch unit to record the code signals before the buffers are reset and consequently before the reader emits a subsequent code in response to the resetting of the buffer.

The output line 54 of the comparator 19 is connected to the set terminal of a compare memory flip flop 55 which is adapted to assume a set state in response to the trailing edge of the comparator output signal. The output line 56 of the compare memory flip flop is connected to one input of each of an upper case AND gate 57 and a lower case AND gate 58 and to one leg of an AND gate 59 whose output is connected to the set terminal of the store flip flop 33.

A case condition flip flop 61 is also provided and when in an assumed lower case state it connects a true signal via line 62 to another leg of the upper case AND gate 57 and a false signal via line 63 to another leg of the lower case AND gate 58. The third input leg of the upper and lower case AND gates 57 and 58 are connected to the transducer cells associated with the upper and lower case precedence designator tracks 13 and 12 respectively.

The output lines 64 and 65 of the upper and lower AND gates are connected respectively to the set and reset terminals of the case condition flip flop 61 which is adapted to assume an upper case state in response to the trailing edge of the signal passed by the upper case AND gate 57, and lower case state in response to the trailing edge of the signal passed by the lower case AND gate 58. The upper and lower case gate output lines 64 and 65 are also connected to trigger the precedence delay multivibrator 43 via an OR gate 66 and, via OR gates 45 to selected bit lines 46 defining second system precedence codes thereby to set up upper and lower case precedence code signals in the punch unit.

As shown in FIGURE 1 the output lines of the AND gates 31 are also connected to an OR circuit 67 whose output line is connected to the reset terminals of the store and the compare memory flip flops 33 and 55 each of which is adapted to switch to reset state in response to the trailing edge of the signal passed by OR gate 67.

Finally the upper and lower case precedence designator detector cell output lines are also connected to an OR circuit 68 whose output is connected to AND gate 59. The store flip flop is adapted to switch to set state in response to the trailing edge of the signal passed by AND gate 59.

*Operation*

The operation of the converter may be more fully appreciated with reference to FIGURE 2 wherein curve 71 represents the output of multivibrator 39; curve 72 represents the reader cycle times; curve 73 represents the output of the transducer assembly 15; curve 74 represents the output of the comparator 19; curve 75 represents the output line of the memory flip flop 55; curve 76 represents the output line of the store flip flop 33; curve 77 represents the output of gates 31; curve 78 represents the buffer output; curve 79 represents the output of the process multivibrator 52; curve 81 represents the punch cycle times; curve 82 represents the output of upper and lower case AND gates 57 and 58; curve 83 represents the output of the precedence delay multivibrator 43.

With the disc 10 rotating clockwise, the reader may be initially cycled by momentarily closing and opening a start switch 85 thereby applying a true signal to gate 38.

The trailing edge of the output signal from gate 38 will trigger multivibrator 39 thereby to generate a reader command signal 86 at time $t_1$ (curve 71). After an interval sufficient to enable the energization of a cycle clutch magnet the reader will be cycled at time $t_2$ as illustrated by curve 72, generating the bit signals of a code on lines 18 over the sense interval T. During the sense interval T of the reader cycle the disc will have made one complete revolution whereby over discrete intervals $1/T$, as indicated on curve 73, the recorded patterns, 5, P, 8, 5, P, 8, etc., will be sensed. Since AND gates 21 are conditioned to pass signals from either the Letters or Figures sector of the disc, as the case may be, as hereinbefore explained and only when compare command holes 14' are sensed, only first system code signals 5 will pass to comparator input lines 20 for comparison with the bit signal pattern on lines 18. Further it should be noted here that AND gates 31 are normally blocked so that no signals from transducer 15 can pass to the buffer unit until gates 31 are conditioned by store flip flop 33 as will hereinafter appear.

Accordingly, sometime, e.g., time $t_3$ during the sensing interval T and over an interval $1/T$ a five bit signal pattern 5 on lines 20 will coincide with the five bit signal pattern on lines 18 whereupon the comparator output line 54 will go true over the interval that the coincident code 5 is under the transducer assembly. The trailing edge of the comparator true signal will set the memory flip flop 55 at time $t_4$. The switching of the comparator memory flip flop 55 to set state applies a true signal via line 56 to upper and lower case AND gates 57 and 58 and to AND gate 59. As the case condition flip flop 61 is normally in a lower case or reset state two of the inputs to the upper case AND gate 57 will be true. As the disc rotates beyond the coincident first system code 5, either an upper or a lower case precedence designator hole will be sensed. If it is a lower case hole 6, indicating that the corresponding character in the second system is lower case, the third input to the upper case AND gate 57 will remain false so that no signal is passed thereby. The lower case AND gate 58 likewise will not pass a signal as its input connected to the case flip flop output line 63 will be false. Hence the case condition flip flop 61 will remain in reset state. The detected precedence designator signal (hole 6) will however pass OR gate 68 and conditioned AND gate 59, the latter remaining conditioned over the set interval of the compare memory flip flop, so that at the end of the precedence designator sensing interval ($t_5$), the store flip flop 33 will be set thereby conditioning AND gates 31 to pass the next generated code signals.

Accordingly, those AND gates 31 corresponding to the next generated code signals of the code 8 corresponding to the coincident first system code 5 will pass signals over the disc sensing intervals $t_6$–$t_7$. The code signals passed during this interval will set up the buffer flip flops at time $t_6$. As the signals passed by AND gates 31 are ORed in gate 67, the store and memory flip flops, which are responsive to the trailing edge of the gated signal, will be reset at time $t_7$.

As neither AND gate 57 or 58 passed a signal, the delay multivibrator 43 will not have been activated; consequently the AND gates 41 will, at time $t_6$, be conditioned to and will pass the second system bit signal pattern in the buffer to lines 46 thereby setting up selected punch magnets. The perforator unit 47 in response to the command signal from OR gate 49, also generated at time $t_6$ will initiate a punch cycle at time $t_8$ whereby the code signals will be recorded in and a record indexed over the interval $t_8$–$t_9$.

As hereinbefore noted the buffer flip flops will be reset after a delay initiated by process multivibrator 52 which is triggered at time $t_6$ by the leading edge of the signal pass by OR gate 51 resulting from passage of bit signals through AND gates 41; the delay being provided to give the record perforator sufficient time to reproduce the data and index the record tape. As shown in FIGURE 2 (curve 79), the delay multivibrator remains active until the end of the punch cycle at time $t_9$. Accordingly the buffers will be reset at time $t_9$ and the trailing edge of the signal from OR gates 36 and 38, which was true over the storage interval, will trigger the multivibrator 39 at time $t_9$ thereby to initiate another cycle of the reader at time $t_{10}$.

If an upper case precedence designator hole 7 is sensed after the next coincident first system code pattern 5, illustrated as occurring at time $t_{11}$, the memory flip flop being set in response thereto at time $t_{12}$, all three inputs to the upper case AND gate will be true at time $t_{13}$ and the output of the gate will remain true over the precedence designator sensing interval $t_{13}$–$t_{14}$. The trailing edge of the AND gate output signal will set the case flip flop 61 to upper case state at time $t_{14}$. The gated precedence or case designator signal on line 64 is connected to selected bit lines 46 which define the second system upper case precedence code thereby setting up punch magnets and initiating a punch cycle via OR gate 49 as before over the interval $t_{16}$–$t_{17}$. The leading edge of the gated precedence signal on line 64 will also trigger the precedence delay multivibrator 43 at time $t_{13}$ thereby blocking and maintaining AND gates 41 blocked over the interval sufficient for the precedence code to be reproduced; the interval being set to terminate coincidentally with the termination of the punch cycle.

As before signals of the second system code 8 corresponding to the coincident first system code 5 will be set into the buffer flip flops at time $t_{15}$ following the precedence designator sensing interval $t_{13}$–$t_{14}$ but since gates 41 are blocked will remain in storage over the intervals of the precedence and the process multivibrators 43 and 52. As shown in FIGURE 2 when the precedence delay multivibrator returns to quiescent state at $t_{17}$ the AND gates 41 will pass the signals in the buffers to the punch input lines and via OR gate 51 trigger the process multivibrator at time $t_{17}$. As before the punch will be cycled at a time $t_{18}$ to record signals of the second system code after which, the buffers having been reset, another reader cycle may be initiated at a time $t_{20}$.

The case condition flip flop will remain in set state until coincidence of a first system code which is lower case in the second system. In this event AND gate 58 will pass a signal which will reset the case condition flip flop and effect the processing of a lower case precedence code prior to the processing of the second system code corresponding to the coincident first system code in the same sequence as when gate 57 passed a signal.

When a blank code is emitted by the reader, no blank code being pre-recorded on the disc, it is detected by a blank detector 91 whose output line 92 is connected to OR circuit 49. This will cycle the record perforating unit which, since no code is on lines 46, will simply index tape. The output of the blank detector is also connected to an OR gate 93 whose output line 94 is connected via OR gate 38 whereby the trailing edge of the blank detector true signal will cause the multivibrator 39 to be triggered. As noted hereinbefore the output signal of the multivibrator 39 will initiate another reader cycle.

If a 5 level figures or letters precedence code is issued by the reader, no corresponding codes being recorded on disc A, they are detected in associated detectors 26 and 27 as hereinbefore noted and whose outputs are also ORed in OR gate 93 thereby to effect a subsequent reader cycle.

While disc records have been disclosed specifically herein with codes represented by perforations, it is to be understood that any endless record such as a tape loop may be employed and that codes may be recorded by means other than by perforating.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for converting information representative codes of a first system to corresponding information representative codes of a second system, lower and upper case information in said second system being represented by identical codes distinguishable by precedence codes, a disc having recorded thereon all of the information representative codes of the first system, all of the upper and lower case information representative codes of the second system, and the case designators of the information represented by each of the second system codes, the recording of a first system code, a case designator of the information represented by a correspoinding second system code, and a corresponding second system code following in turn on serial radial lines on said disc, the radial lines bearing first system information representative codes including identifying markers, transducer means, means for continuously driving said disc relative to said transducer means thereby to generate signals corresponding to said recorded codes, markers and designators, a source operative to issue first system information representative code signals for conversion, code comparator means operative to detect coincidence of source issued information representative code signals and code signals generated by said transducer means and to issue an output signal upon coincidence thereof, first gate means enabled in response to marker signals for gating only first system information representative code signals generated by said transducer means to said code comparator means for comparison with source issued information representative code signals, second gate means conditioned by the output signal from said code comparator means for gating the second system code signals generated by said transducer means corresponding to the coincident first system code, and control means operatively responsive to case designator signals to pass gated second system code signals to a recorder when the case designator signal of the information represented thereby is the same as that generated prior to the last gated second system code, and for delaying passage of the gated second system code signals and for generating precedence code signals for recording during the delay period when the generated case designator signal differs from that generated prior to the last gated second system code.

2. Apparatus for converting information representative codes of a first system to corresponding information representative codes of a second system, lower and upper case information in said second system being represented by identical codes distinguishable by precedence codes, a disc having recorded thereon all of the information representative codes of the first system, all of the upper and lower case information representative codes of the second system, and the case designators of the information represented by each of the second system codes, the recording of a first system code, a case designator of the information represented by a corresponding second system code, and a corresponding second system code following in turn on serial radial lines on said disc, the radial lines bearing first system information representative codes including identifying markers, transducer means, means for continuously driving said disc relative to said transducer means thereby to generate signals corresponding to said recorded codes, markers and designators, a source operative to issue first system information representative code signals for conversion, code comparator means operative to detect coincidence of source issued information representative code signals and code signals generated by said transducer means and to issue an output signal upon coincidence thereof, first gate means enabled in response to marker signals for gating only first system information representative code signals generated by said transducer means to said code comparator means for comparison with source issued information representative code signals, first control means responsive to the output signal from said code comparator means, a buffer storage unit, second control means operative in response to the trailing edge of the case designator signal following the output signal of said code comparator means for passing the second system code signals generated by said transducer means corresponding to the coincident first system code to said storage unit, a recording unit, second gate means normally conditioned to pass stored signals to said recording unit for reproduction, and third control means conditioned by said first control means and responsive to a case designator signal generated after coincidence of first system code signals which designates that the case of the information represented by the next following second system code differs from that of the information whose code was last recorded for blocking said second gate means over an interval required to record a precedence code and for generating precedence code signals for recording.

3. Apparatus for converting information representative codes of a first system to corresponding information representative codes of a second system, lower and upper case information in said second system being represented by identical codes distinguishable by precedence codes, a disc having recorded thereon all of the information representative codes of the first system, all of the upper and lower case information representative codes of the second system, and the case designators of the information represented by each of the second system codes, the recording of a first system code, a case designator of the information represented by a corresponding second system code, and a corresponding second system code following in turn on serial radial lines on said disc, the radial lines bearing first system information representative codes including identifying markers, transducer means, means for continuously driving said disc relative to said transducer means thereby to generate signals corresponding to said recorded codes, markers and designators, a source operative to issue first system information representative code signals for conversion, code comparator means operative to detect coincidence of source issued information representative code signals and code signals generated by said transducer means and to issue an output signal upon coincidence thereof, first gate means enabled in response to marker signals for gating only first system information representative code signals generated by said transducer means to said code comparator means for comparison with source issued information representative code signals, first bistable means responsive to the trailing edge of the output signal from said code comparator means, a buffer storage unit, second bistable means conditioned for operation by said first bistable means and operative in response to the trailing edge of a case designator signal following the output signal from said code comparator means for generating a gate signal, second gate means for passing the second system code signals generated by said transducer means corresponding to the coincident first system code to said storage unit in response to said gate signal, said first and second bistable means being reset in response to the trailing edge of said gate output signal, a recording unit, third gate means normally conditioned to pass stored signals to said recording unit for reproduction, and control means conditioned by said first bistable means and operative thereafter in response to a case designator signal generated after the coincidence interval which represents that the case of the second system information represented by the next following second system code differs from that of the information whose code was last recorded for blocking said third gate means over an interval required to record a precedence code, said operative control means generating precedence code signals for recording.

4. Apparatus for converting information representative codes of a first system to corresponding information representative codes of a second system, said first system employing identical codes to represent lower and upper case information, and precedence codes to distinguish between upper and lower case information, a disc having recorded therein all of the first system information representative codes and the case designators of the information represented thereby, and all of the corresponding second system information representative codes, the recording of a first system code and the case designator of the information represented thereby, and a corresponding second system code following in turn on serial radial lines on said disc; the radial lines bearing first system information representative codes including identifying markers, transducer means, means for continuously driving said disc relative to said transducer means thereby to generate signals corresponding to said recorded codes, markers and designators, a source operative to issue first system information representative code signals and precedence code signals, code comparator means operative to detect coincidence of source issued information representative code signals and code signals generated by said transducer means and to issue an output signal upon coincidence thereof, a bistable circuit operable to set and reset states in response to lower and upper case precedence code signals issued by said source, first gate means enabled by said set bistable circuit to pass a first system lower case designator signal generated by said transducer means, second gate means enabled by said reset bistable circuit to pass a first system upper case designator signal generated by said transducer means, third gate means enabled by the output of either of said first and second gate means and by a marker signal generated by said transducer means to pass only first system code signals generated by said transducer means which represent information of the same case as that represented by source issued code signals, and fourth gate means enabled by the output signal of said code comparator means to pass the second system code signals corresponding to the coincident first system code to a utilization device.

5. Apparatus for converting information representative codes of a first system to corresponding information representative codes of a second system, each system employing identical codes to represent upper and lower case information, and precedence codes to distinguish between upper and lower case information, and wherein the case assignment of information is likely to differ from system to system, comprising, a disc having recorded thereon all of the information representative codes of said first system and the case designators of the information represented by each of said first system codes, all of the corresponding information representative codes of said second system and the case designators of information represented by each of said second system codes, the recording of a first system code and the case designator of the information represented thereby, a case designator of the information represented by a corresponding second system code, and a corresponding second system code, following in turn on serial radial lines on said disc, the radial lines bearing first system codes including identifying markers, transducer means, means for continuously driving said disc relative to said transducer means thereby to generate signals corresponding to said recorded codes, designators and markers, a source operative to issue first system information representative code signals and precedence code signals, code comparator means operative to detect coincidence of source issued information representative code signals and code signals generated by said transducer means, and to issue an output signal upon coincidence thereof, a bistable circuit operable to set and reset states in response to lower and upper case precedence code signals issued by said source, first gate means enabled by said set bistable circuit to pass a first system lower case designator signal generated by said transducer means, second gate means enabled by said reset bistable circuit to pass a first system upper case designator signal generated by said transducer means, third gate means enabled by the output of either of said first and second gate means and by a marker signal generated by said transducer means to pass only first system code signals generated by said transducer means which represent information of the same case as that represented by the source issued code signals, fourth gate means enabled by the output signal of said code comparator means to gate the second system code signals corresponding to the coincident code, and control means operatively responsive to second system case designator signals to pass second system code signals gated by said fourth gate means to a recorder when the case designator signal is the same as that generated prior to the last gated second system code signals, and for delaying the recording of the code signals passed by said fourth gate means and for generating second system precedence code signals for recording during the delay period when the case designator signal differs from that generated prior to the last gated second system code signals.

6. Apparatus for converting information representative codes of a first system to corresponding information representative codes of a second system, lower and upper case information in said second system being represented by identical codes distinguishable by precedence codes, a disc having recorded thereon all of the information representative codes of the first system, all of the upper and lower case information representative codes of the second system, and the case designators of the information represented by each of the second system codes, the recording of a first system code, a case designator of the information represented by a corresponding second system code, and a corresponding second system code following in turn on serial radial lines on said disc, the radial lines bearing first system information representative codes including identifying markers, transducer means, means for continuously driving said disc relative to said transducer means thereby to generate signals corresponding to said recorded codes, markers and designators, a source operative to issue first system information representative code signals for conversion, code comparator means operative to detect coincidence of source issued information representative code signals and code signals generated by said transducer means and to issue an output signal upon coincidence thereof, first gate means enabled in response to marker signals for gating only first system information representative code signals generated by said transducer means to said code comparator means for comparison with source issued information representative code signals, first bistable means operative to set condition in response to the trailing edge of the output signal from said code comparator means, a buffer storage unit, second bistable means conditioned by said set first bistable means and operative to set condition in response to the trailing edge of a designator signal following the output signal of said code comparator means for generating a gate signal, second gate means enabled in response to said gate signal for passing the second system code signals generated by said transducer means corresponding to the coincident first system code to and for setting said storage unit, said first and second bistable means being operable to reset condition by the trailing edge of the signals passed by said second gate means, a recording unit, third gate means normally conditioned to pass stored signals to said recording unit for reproduction, first delay means responsive to code signals gated by said third gate means for resetting said storage unit upon reproduction of said stored code, means operative in response to the resetting of said buffer storage unit to cause said source to issue subsequent first system code signals for conversion, a bistable circuit operable from a lower case state, indicative of the fact that the last second system code recorded represented lower case information, to an upper case state when the second system code signals in storage represent upper case information and vice versa, upper and lower case gates, said upper case gate being conditioned when said first bistable means is set and said bistable circuit is in lower case state and being operable in response to an upper case designator signal, said lower case gate being conditioned when said first bistable means is set and said bistable circuit is in upper case state and being operable in response to a lower case designator signal, said bistable circuit being operable from lower to upper case state and from upper to lower case state in response to signals passed by said upper and lower case gates respectively, second delay means responsive to signals passed by either of said case gates operable to block said third gate means until a precedence code has been recorded, and means for generating precedence code signals in response to said case gate output signals.

7. Apparatus as recited in claim 6 further comprising means responsive to first system precedence and blank codes generated by said source for causing said source to issue subsequent code signals.

References Cited by the Examiner

UNITED STATES PATENTS

| | | | |
|---|---|---|---|
| 2,784,397 | 3/1957 | Branson et al. | 340—378 |
| 3,201,780 | 8/1965 | Gryk | 340—347 |
| 3,201,782 | 8/1965 | Von Kummer | 340—347 |

MAYNARD R. WILBUR, *Primary Examiner.*

W. J. ATKINS, A. L. NEWMAN, *Assistant Examiners.*